United States Patent
Rajaniemi et al.

(10) Patent No.: US 6,898,433 B1
(45) Date of Patent: May 24, 2005

(54) LOCATION MANAGEMENT FOR CELLULAR SYSTEMS

(75) Inventors: Jaakko Rajaniemi, Helsinki (FI); Kalle Ahmavaara, Helsinki (FI); Heikki Einola, Espoo (FI); Juha Bäck, Helsinki (FI); Tony Hulkkonen, Helsinki (FI); Serge Haumont, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/763,883

(22) PCT Filed: Apr. 26, 2000

(86) PCT No.: PCT/FI00/00357

§ 371 (c)(1),
(2), (4) Date: Apr. 16, 2001

(87) PCT Pub. No.: WO01/01718

PCT Pub. Date: Jan. 4, 2001

(30) Foreign Application Priority Data

Jun. 28, 1999 (FI) ................................................. 991466

(51) Int. Cl.[7] ............................................... H04Q 7/20
(52) U.S. Cl. ............................... 455/456.1; 455/456.3; 455/456.5; 455/560
(58) Field of Search .......................... 455/456.1, 456.3, 455/456.5, 560

(56) References Cited

U.S. PATENT DOCUMENTS

| | | | |
|---|---|---|---|
| 5,826,188 A | * | 10/1998 | Tayloe et al. ................ 455/428 |
| 6,374,112 B1 | * | 4/2002 | Widegren et al. ......... 455/452.2 |
| 6,397,065 B1 | * | 5/2002 | Huusko et al. ........... 455/435.2 |
| 2002/0086682 A1 | * | 7/2002 | Naghian ...................... 455/456 |

FOREIGN PATENT DOCUMENTS

| | | | | |
|---|---|---|---|---|
| FI | WO-98/37721 | * | 8/1998 | ............. H04Q/7/38 |
| WO | WO 98/32304 | | 7/1998 | |
| WO | WO 99/09774 | | 2/1999 | |
| WO | WO 99/20071 | | 4/1999 | |
| WO | WO 99/66740 | | 12/1999 | |
| WO | WO 00/11878 | | 3/2000 | |

* cited by examiner

*Primary Examiner*—Vivian Chin
*Assistant Examiner*—Minh D. Dao
(74) *Attorney, Agent, or Firm*—Pillsbury Winthrop Shaw Pittman LLP

(57) ABSTRACT

A method for indicating a mobile station's (MS) location. A first radio network controller, RNC, acts as the mobile station's serving RNC (SRNC), for reporting the mobile station's location to the core network (CN). A second RNC acts as the mobile station's drift RNC (DRNC), for maintaining a radio connection with the mobile station. In response to fulfillment of at least one criterion in a first set of criteria, the mobile station (MS) sends location information about its location to the second RNC (DRNC) which forwards the location information to the first RNC (SRNC) for reporting to the core network (CN). There is also a second set of criteria for transforming the location information. In response to fulfillment of at least one criterion in the second set, the first RNC (SRNC) sends falsified information about the mobile station's location to the core network (CN).

21 Claims, 3 Drawing Sheets

LOCATION MANAGEMENT FOR CELLULAR SYSTEMS

BACKGROUND OF THE INVENTION

The invention relates to methods and equipment for reporting a mobile terminal's location. The invention can be used e.g. for implementing handover in a mobile communications system. The invention is particularly useful in a system which is at least partly a third generation (3G) mobile communications system. 3G mobile communications systems, such as the UMTS (Universal Mobile Telecommunications System) are being standardised by the UMTS Forum and the European Telecommunication Standard Institute ETSI. The current vision is that 3G systems will include both circuit-switched and packet-switched components.

FIG. 1 is a block diagram of a telecommunications system showing the components which are essential for understanding the invention. A UMTS Mobile Station MS consists of Mobile Equipment ME and a USIM card (User and Services and Identity Module). There is a radio interface Uu between the MS and a Radio Access Network RAN, which comprises Base Stations BS under control of Radio Network Controllers RNC. For circuit-switched services, the RNCs are connected, via an Iu interface, to Mobile services Switching Centres MSC, and for packet-switched services, there is a connection, via a Gb interface, to Serving GPRS Support Nodes SGSN (GPRS=General Packet Radio Service). The MSC and SGSN elements may include separate UMTS addition sections. Subscriber data related to the MS is stored permanently in a Home Location Register HLR and for circuit-switched operation, the data is transferred to the Visitor Location Register VLR of the MSC which currently serves the MS. There may be separate Interworking units IWU for adapting the A and Gb interfaces of GSM/GPRS systems to the Iu interface of the UMTS. For storing equipment-related data, the network comprises an Equipment Identity Register EIR. For entering and updating subscriber-specific data, there is an Operation and Maintenance O&M section having a Man-Machine Interface MMI. For creating and managing supplementary services, there is typically a dedicated Service Control Node SCN which can be seen as an evolved version of a Service Control Point (SCP) of Intelligent Networks.

Only the packet-switched section will be described in more detail, and it is assumed that this section will resemble a GPRS system. The GPRS infrastructure comprises support nodes such as a GPRS gateway support node (GGSN) and a GPRS serving support node (SGSN). The main functions of the GGSN nodes involve interaction with the external data network. The GGSN updates the location directory using routing information supplied by the SGSNs about an MS's path and routes the external data network protocol packet encapsulated over the GPRS backbone to the SGSN currently serving the MS. It also decapsulates and forwards external data network packets to the appropriate data network and handles the billing of data traffic.

The main functions of the SGSN are to detect new GPRS mobile stations in its service area, handle the process of registering the new MSs along with the GPRS registers, send/receive data packets to/from the GPRS MS, and keep a record of the location of the MSs inside of its service area. The subscription information is stored in a GPRS register (HLR) where the mapping between a mobile's identity (such as MS-ISDN or IMSI) and the PSPDN address is stored. The GPRS register acts as a database from which the SGSNs can ask whether a new MS in its area is allowed to join the GPRS network.

The GPRS gateway support nodes GGSN connect an operator's GPRS network to external systems, such as other operators' GPRS systems, data networks 11, such as an IP network (Internet) or a X.25 network, and service centres. Fixed hosts 14 can be connected to the data network 11 e.g. by means of a local area network LAN and a router 15. A border gateway BG provides access to an inter-operator GPRS backbone network 12. The GGSN may also be connected directly to a private corporate network or a host. The GGSN includes GPRS subscribers' PDP (Packet Data Protocol) addresses and routing information, i.e. SGSN addresses. Routing information is used for tunnelling protocol data units PDU from data network 11 to the current switching point of the MS, i.e. to the serving SGSN. The functionalities of the SGSN and GGSN can be connected to the same physical node.

The home location register HLR of the GSM network contains GPRS subscriber data and routing information and it maps the subscriber's IMSI into an SGSN address and one or more pairs of the PDP type and PDP address. The HLR also maps each PDP type and PDP address pair into a GGSN node. The SGSN has a Gr interface to the HLR (a direct signalling connection or via an internal backbone network 13). The HLR of a roaming MS and its serving SGSN may be in different mobile communication networks.

The intra-operator backbone network 13, which interconnects an operator's SGSN and GGSN equipment, can be implemented, for example, by means of a local network; such as an IP network. It should be noted that an operator's GPRS network can also be implemented without the intra-operator backbone network, e.g. by providing all features in one computer.

FIG. 2 shows the protocol stacks used at various points in a 3G network.

A mobile station (MS) engaged in GPRS traffic sends a CELL UPDATE (CU) message after detecting that it has changed its cell. A number of cells constitute a routing area (RA), and when the routing area changes, the MS sends a ROUTING AREA UPDATE (RAU) message. In the UMTS the cell update messages are not sent to the SGSN, only to the RNC. Therefore the SGSN is not aware of the exact cell of the MS. For an active MS, the SGSN only knows an identifier of the RNC which handles the MS. For an idle MS, the SGSN only knows the MS's routing area identifier.

A first problem underlying the invention will now be described with reference to FIG. 3. A 3G system may pose certain problems which do not exist in 2G systems, such as the GSM and the GPRS. For example, when the MS is changing its cell, it is possible that a connection-oriented connection is not handled by the RNC controlling the MS's active cells but by another RNC. The former RNC is called a 'drift RNC' and the latter RNC is called a 'serving RNC'. In FIG. 3, RNC1 is the serving RNC (SRNC) and RNC2 is the drift RNC (DRNC). In such a case, the CU and RAU messages are transmitted over the air interface piggybacked to the channel which is reserved for the circuit-switched connection (connection-oriented connection), and they terminate at the serving RNC. In a GPRS core network, if the Radio Access Network (RAN) inserts a cell ID (identifier) into the CU or RAU messages, thereby indicating where the MS is actually located, and if that cell is not controlled by the serving RNC, the SGSN may use another RNC for the packet-switched connections. This is not possible, however, because all simultaneous connections for one user should be handled by one RNC. In other words, there may be an ambiguity concerning the RNC which the SGSN should use.

The same holds in a UMTS system if the Radio Access Network (RAN) inserts a cell ID (identifier) into a RAU message or an equivalent.

A second, related problem is that current GPRS or 3G systems do not offer a smooth Inter-SGSN routing area update (RAU) procedure. A lot of signalling is needed between the new SGSN and the old SGSN, the HLR, MSC and the GGSN(s). In particular, the new SGSN must receive the sub-scriber data from the old SGSN before it can be sure that it can accept the RAU and continue signalling. This signalling causes a delay of up to several seconds, which in some cases could be unacceptable. Moreover, in packet traffic a virtual connection can last for several days. Therefore, the existing concepts of an anchor-MSC and float-MSC are not appropriate.

DISCLOSURE OF THE INVENTION

It is an object of the invention to provide a method and equipment for eliminating the first problem associated with prior art systems. The object is attained with the method and equipment which are characterized by what is disclosed in the characerizing part of the appended independent claims. Solutions to the second problem and preferred solutions to the first problem are disclosed in the appended dependent claims.

The invention is based on the idea that for a terminal sending information on the basis of which its location can be determined (such as a mobile station having a connection-oriented connection while sending a CU or RAU message), the terminal's location information (e.g. its cell ID) can be-transformed, e.g. by using a masked or falsified (faked) location information, such as a fake cell ID. The fake location information is preferably chosen so that the SGSN assumes the location of the MS to be under the serving RNC. A certain pool or group of cell addresses can be used for this purpose. It might be beneficial to choose the addresses so that the SRNC (or SGSN) can detect that the traffic has been forwarded.

According to various preferred embodiments of the invention, the information about the MS's location indicates one or more of the following:

- a location (e.g. a cell) which is controlled by the SRNC and which is part of the MS's active set, if such a cell exists;
- a virtual location (e.g. cell), which is not controlled by either RNC, in case the MS's active set does not comprise a cell which is controlled by the SRNC;
- the last location (e.g. a cell) which is controlled by the SRNC and which has been part of the MS's active set in case the MS's active set does not comprise a cell which is controlled by the SRNC;
- a location (e.g. a cell) controlled by the DRNC in case the MS's active set does not comprise a cell controlled by the SRNC; and/or
- a location (e.g. a cell) whose location information the MS received last.

The fact that the MS's location information indicates one of these cells has-two possible interpretations. The MS's location information may indicate such a cell either explicitly or implicitly. An explicit indication means that the location information contains actual cell identifiers. An implicit indication means that the location information contains some information (e.g. one or more routing or location area identifiers) on the basis of which a cell can be identified (if so desired). It is also feasible to transfer only some location-related data and use it for calculating the MS's location.

The criteria for sending location information preferably comprises a change of the MS's location, activation of a PDP context for the MS and expiry of a recurring period of time.

As briefly noted above, the information about the MS's location may indicate a location, such as a cell, whose location information the MS received last. When a mobile station has at least one active connection, it receives system information only via its dedicated signalling connection. This system information comprises e.g. current location (such as routing area, location area and cell identity) of the mobile station. The system information is similar in nature to the information which the MS receives via a broadcast control channel BCCH when it does not have any active connections. The SRNC only sends system information about the cells controlled by it. In other words, it does not send system information about cells controlled by the DRNC. Based on the system information, the MS can determine whether or not it has moved into a new routing or location area. The SRNC sends this information as necessary. One suitable criterion for sending it is that the MS has moved and its active set does not contain the cell whose system information the SRNC has sent last, or after an SRNC handover (relocation).

Use of the transformed location, such as a fake cell ID, causes another problem, however. When the MS's last connection-oriented connection is terminated and the serving RNC deleted from the MS-URAN connection, the SGSN must be informed about the new (correct) RNC. This holds also for cases where the serving RNC is changed. This problem can be solved as follows. If the MS's last connection-oriented connection is terminated or if the serving RNC is changed, an additional CU or RAU must be performed for the MS, even if the MS's location information has not changed.

The location reporting functionality performed by a serving RNC can be summarised as follows:

1. Check if RNC handover should be performed. If not, then:
2. Select a location, such as a cell which is controlled by the serving RNC and which is part of the MS's active set, if such a cell exists. (N.B. The active set must also comprise at least one cell controlled by the drift RNC, otherwise the concept of drift RNC would not exist.)

If no handover was performed in step 1 or no cell was found in step 2, then do one of the following:

3A. Select a virtual location, such as a cell. A virtual cell is not a real cell (i.e. it is not covered by radio transceivers); or 3B. Select, among the cells controlled by the serving RNC, the last one used by the MS.

If step 3A is taken, i.e. a virtual location is selected, the core network elements (the MSC and/or the SGSN) must determine that the location information does not refer to reallocation. Such a determination can be made on the basis of a suitable cell ID numbering plan or a translation table.

BRIEF DESCRIPTION OF THE DRAWINGS

The invention will now be described in connection with its preferred embodiments, with reference to the accompanying drawings, in which.

DETAILED DESCRIPTION OF THE INVENTION

Figure 1:
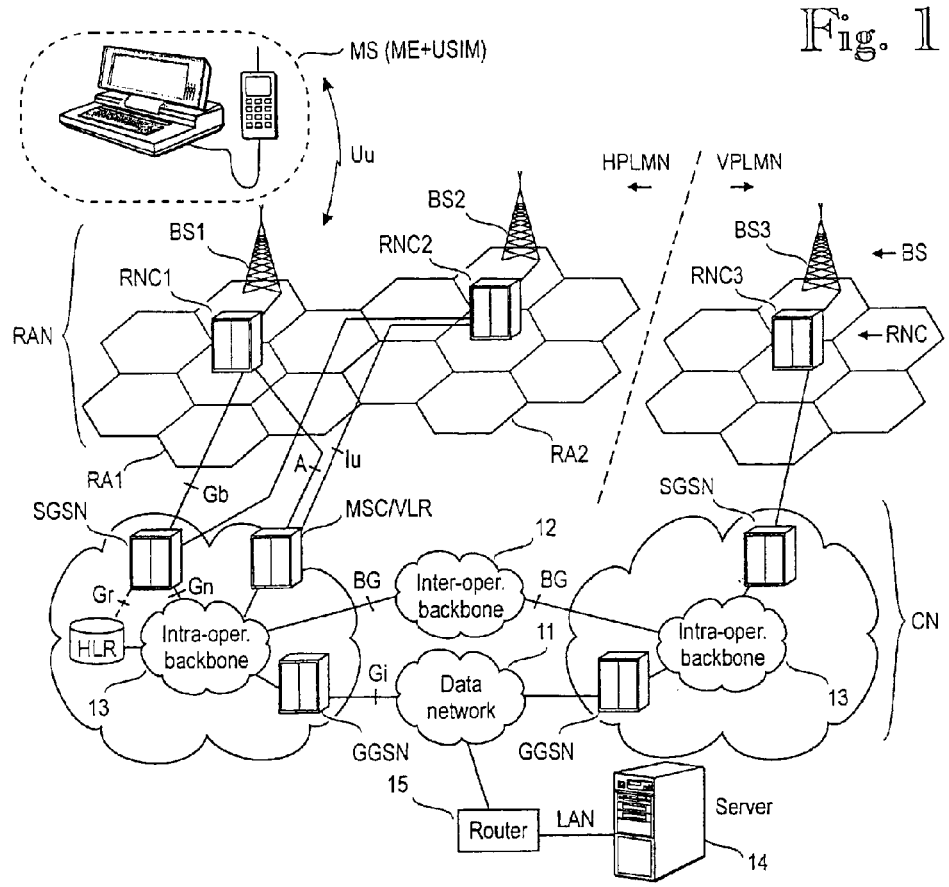
FIG. 1 is a block diagram of a telecommunications system showing the components which are essential for understanding the invention.
Figure 2:
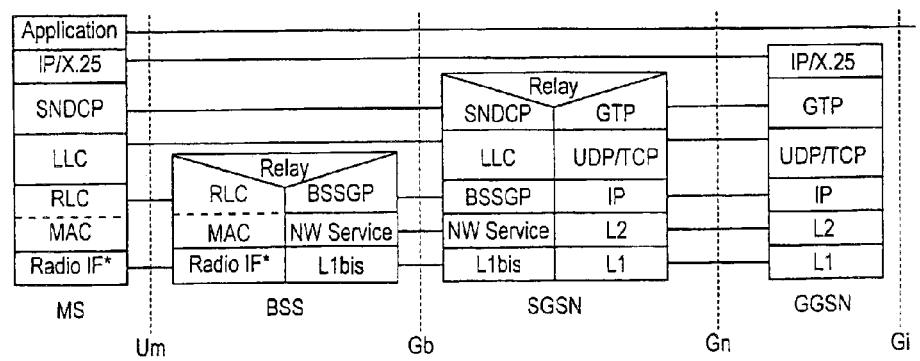
FIG. 2 shows the protocol stacks used at various points in a 3G network.
Figure 3:
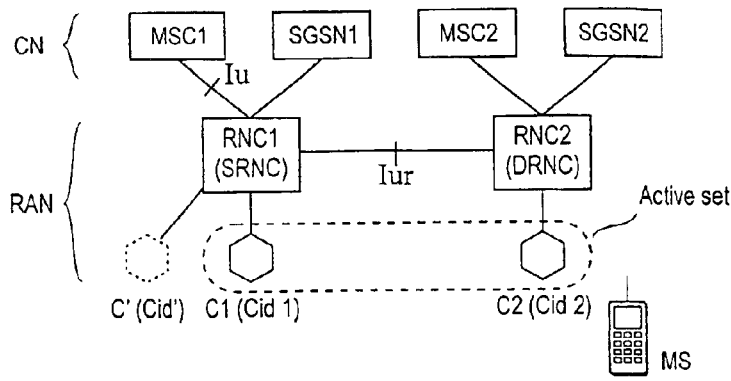
FIG. 3 is a simplified block diagram for pointing out the problem more clearly.
Figure 4:
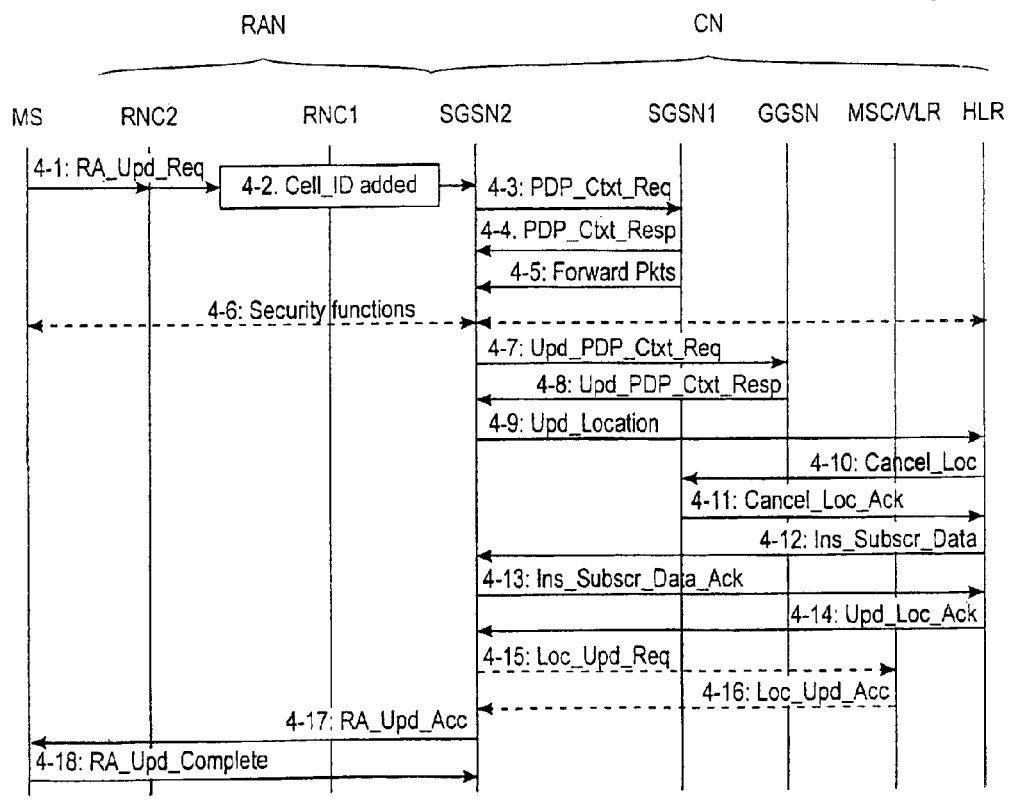
FIG. 4 shows a routing area update (RAU) procedure for a GPRS network.

FIG. 4 shows a routing area update (RAU) procedure for a GPRS network. In step 4-1 the MS sends a ROUTING AREA UPDATE REQUEST via RNC2 (drift RNC) to RNC1 (serving RNC). In step 4-2 RNC1 adds the MS's location information and forwards the RAU Request to SGSN1. In step 4-3 SGSN2 requests the MS's PDP context from SGSN1 which responds in step 4-4. In step 4-5 SGSN1 begins to forward MS-terminated (MT) packets to SGSN2. Security functions have been shown as step 4-6. In step 4-7 SGSN2 sends an UPDATE PDP CONTEXT REQUEST to the GGSN node which responds in step 4-8. In step 4-9 the MS's location is updated in the HLR. In step 4-10 the HLR cancels the MS's location in SGSN1 which acknowledges this in step 4-11. In step 4-12 the HLR sends an INSERT SUBSCRIBER DATA to SGSN2 which acknowledges in step 4-13. In step 4-14 the HLR sends to SGSN2 an acknowledgement to the message sent in step 4-9. In step 4-15, if the MS is IMSI-attached and does not have a circuit-switched connection, the SGSN-VLR association must be updated. SGSN2 updates the MS's location and SGSN number in the VLR, which acknowledges these in step 4-16. In steps 4-17 and 4-18 the RAU process is completed.

Figure 5:
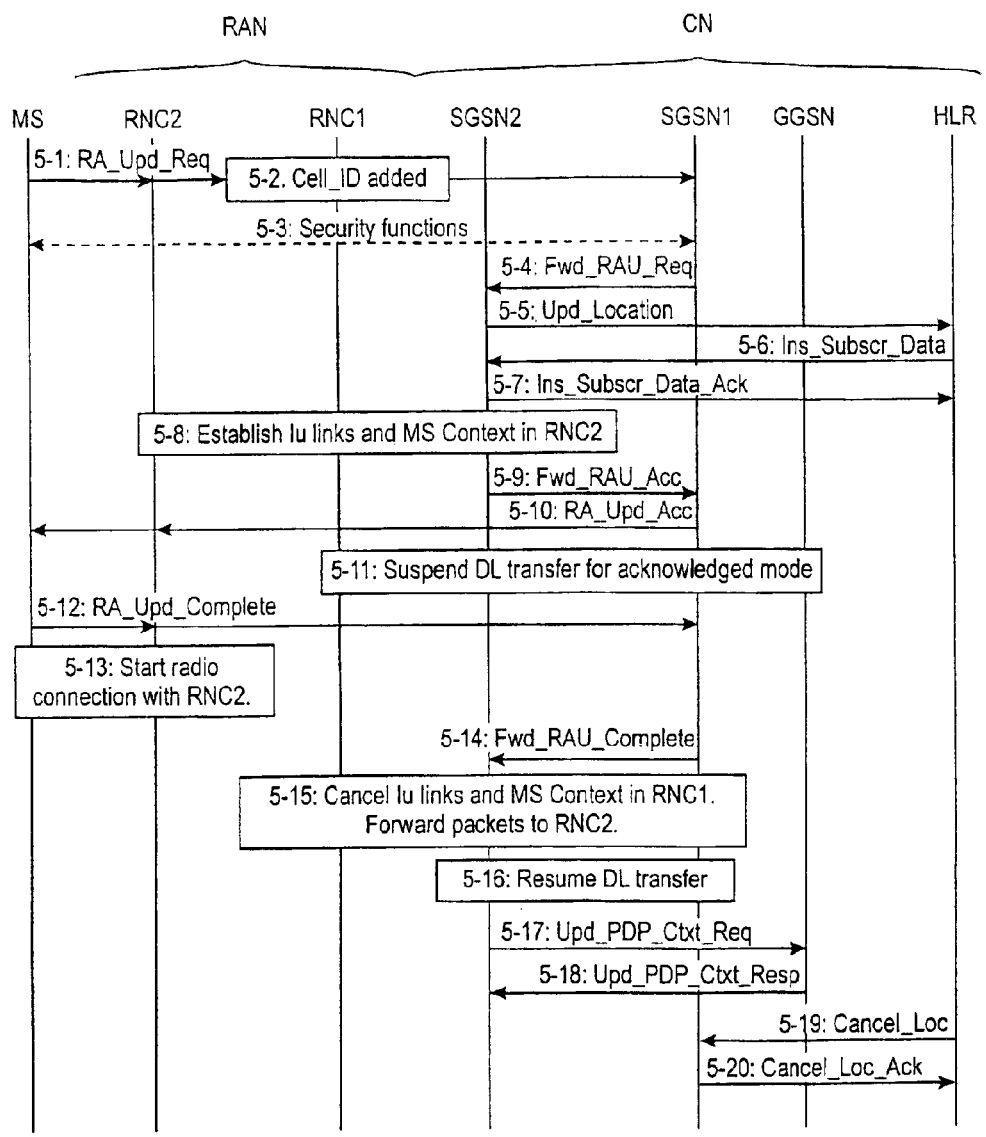
FIG. 5 shows an alternative Inter-SGSN routing area update procedure according to a preferred embodiment of the invention.

FIG. 5 shows an alternative Inter-SGSN routing area update procedure according to a preferred embodiment of the invention. This embodiment and its alternative modifications solve the second problem underlying the invention.

Due to macrodiversity, the triggering of a RAU is less clear than in 2G systems. A RAU could be triggered e.g. if all cells in the MS's active set belong to the new RA, or if more than half of the cells belong to it. In step 5-1 the MS sends a ROUTING AREA UPDATE REQUEST via RNC2 (drift RNC) to RNC1 (serving RNC). The MS sends the RAU request via its uplink connection if one exists. Because of the coexistence of the drift RNC and the serving. RNC, the update is received by the SRNC which does not control the MS's; new routing area. The MS should suspend its session management procedures. In step 5-2 RNC1 adds the MS's location information and forwards the RAU REQUEST to SGSN1. This is in contrast to prior art GPRS systems where the RAU REQUEST is sent to SGSN2. In step 5-3 security functions may be performed, as usual. A benefit of sending the RAU REQUEST to SGSN1 is that SGSN1 already knows the MS's digital signature (PTMSI signature in GPRS terms), and it is likely to have authentication triplets for it. Thus there is no need to fetch these separately, whereby the delays due to the inter-SGSN handover can be shortened.

In step 5-4, if the security functions are completed successfully, the SGSN1 sends a FORWARD RAU REQUEST to SGSN2. This message includes parameters for resuming the connection(s) after the RAU. Such parameters include session management data and eventually Iu information (address of RNC2). SGSN1 may start a timing period during which it will keep the MS's data in its memory.

In step 5—5 SGSN2 updates the MS's location (IMSI, SGSN address) in the HLR. In step 5-6 the HLR inserts the subscriber data (IMSI, subscription details) into SGSN2 which validates the MS's presence in the new RA. If all regional and other checks are passed, SGSN2 establishes an MM (Mobility Management) context for the MS and returns an acknowledgement to the HLR in step 5-7.

In step 5-8 SGSN2 may establish an Iu link to RNC2 which may send some radio parameters to resume quickly a connection with the MS. This feature is especially useful if the MS has a delay-sensitive application (this can be determined by checking the MS's session management context).

In step 5-9 SGSN2 returns an accept message to the message sent in step 5-4. The accept message includes the new RA index, the MS's new temporary identity (P-TMSI in GPRS terms) and/or its new digital signature. Additionally, some radio parameters or codes obtained from RNC2 may be sent. SGSN1 should immediately acknowledge this message to facilitate error handling. In step 5-10 SGSN1 sends to the MS an RAU ACCEPT message, which preferably contains the same parameters as the message of step 5-9. Additionally, if an acknowledgement transmission is active, it may contain some protocol state information known by SGSN1 (this corresponds to LLC acknowledgement in GPRS).

In step 5-11 SGSN1 suspends downlink data transmission for acknowledged mode, in order to keep the protocol state intact. Depending on the QoS, SGSN1 may continue data transmission for unacknowledged mode.

In step 5-12 the MS acknowledges with a RAU COMPLETE message which contains the new temporary identity (P-TMSI) and some protocol state information known by the MS, such as an LLC acknowledgement for each LLC connection used by the MS (which confirms all MT N-PDUs transferred succesfully before the start of the update procedure. If the packet acknowledgement (equivalent to LLC acknowledgement in GPRS) confirms reception of certain N-PDUs, these N-PDUs will be discarded by SGSN1. This message will trigger RNC relocation (which in this embodiment is triggered by the MS).

In step 5-13 the MS establishes a radio connection with RNC2. If radio parameters were sent in step 5-10 (RAU ACCEPT), the MS could set up a radio connection immediately with these parameters. Otherwise, the MS should re-establish the radio connection by accessing the common channel, which causes a longer break in the connection. This is why sending the radio parameters in step 5-10 may be QoS-dependent. The MS should send an uplink packet (not shown) to SGSN2 in case the RAU COMPLETE message was lost because of error handling. An alternative embodiment, omitting step 5-13, will be described later.

In step 5-14 SGSN1 sends a FORWARD RAU COMPLETE message to SGSN2. In step 5-15 SGSN1 cancels the Iu links towards RNC1 and begins to forward downlink packets to SGSN2. It may keep the MS's context and forward MT packets until the expiry of the optional timing period which was started in step 5-4. In step 5-16, when SGSN2 receives the FORWARD RAU COMPLETE message, it resumes data transmission towards the MS.

In step 5-17 SGSN2 sends to the relevant GGSN(s) an UPDATE PDP CONTEXT REQUEST (SGSN2 address, Tunnel Identifier, QoS Negotiated). The GGSNs update their PDP context fields and return a response in step 5-18. N.B: Steps 5-17 and 5-18 may take place any time after step 5—5.

In step 5-19 the HLR cancels the MS's location in SGSN1. This message contains the MS's IMSI, and the cancellation type is set to Update procedure. If the optional timer was not set in step 5-4, SGSN1 deletes the MS's MM and PDP contexts. Otherwise it waits until the timer expires.

The timing period allows SGSN1 to complete forwarding of N-PDUs. It also ensures that the MS's MM and PDP contexts are kept in case the MS initiates another Inter-SGSN RAU before completing the ongoing RAU. In step 5-20 SGSN1 acknowledges with a CANCEL LOCATION ACK.

According to an alternative embodiment step 5-13 is omitted. Instead, during step 5-15 RNC1 receives an indication from SGSN1 that the RNC could now be relocated. RNC1 will inform RNC2 which will start handling the MS directly.

In general, the invention is equally applicable if the SGSN is replaced by a 3G MSC (or an MSC/SGSN combination). For this embodiment, the MSC and/or SGSN could be called 'switching elements' since they route packets and/or establish circuit-switched connections.

In GSM systems no location area updates are performed during connection, in order not to confuse the relay and anchor MSCs. With macro diversity the LAU could reach the old MSC directly, whereby it is possible to have a LAU during a call. However, in a hard inter-MSC handover, a special message (LAU with an active call indication) may be needed. Such a message could rigger the new MSC to establish a connection with the old MSC and try to resume the call. A problem is that this would happen especially between the GSM and the UMTS, which means that a GSM MSC would need to interpret this special LAU message.

It should be noted that FIGS. 4 and 5 illustrate worst-case scenarios in the sense that both RNCs are under different SGSN nodes or MSCs. If the SGSNs or the MSCs are the same, these scenarios could be simplified accordingly.

What is claimed is:

1. A method of locating a terminal in a telecommunications system including a core network and an access network, the access network including a first network controller configured to at least temporarily act as a serving network controller of the terminal and to report a location of the terminal to the core network, and a second network controller configured to at least temporarily act as a drift network controller of the terminal and to maintain a connection with the terminal, the method comprising:
   transmitting location information of the terminal to the core network based on a first set of predetermined criteria, the location information being indicative of the terminal location;
   transmitting location information to the second network controller in response to the first set of predetermined criteria;
   transmitting the location information to the first network controller;
   reporting the location information to the core network;
   transforming the location information into transformed location information based on a second set of predetermined criteria; and
   transmitting the transformed information to the core network in response to the second set of predetermined criteria.

2. The method of claim 1, further comprising:
   terminating a number of connection-oriented connections with the terminal; and
   reporting a real or correct location of the terminal to the core network in response to terminating a last connection-oriented connection with the terminal.

3. The method of claim 2, wherein the first set of criteria comprises a change of the terminal location, activation of a Packet Data Protocol context for the terminal and expiry of a recurring period of time.

4. The method of claim 1, wherein the terminal has an active set including the terminal location when the location of the terminal exists and is controlled by the first network controller.

5. The method of claim 4, wherein the location information indicates a virtual location when the active set of the terminal excludes a location controlled by the first network controller.

6. The method of claim 4, wherein the location information indicates a current terminal location controlled by the first network controller and the active set of the terminal includes the current terminal location.

7. The method of claim 4, wherein the location information indicates a terminal location which is at least partially controlled by the first network controller.

8. The method of claim 1, further comprising:
   receiving location information using the terminal, wherein the location information indicates a terminal location from which the terminal last received location information.

9. The method of claim 1, wherein the location information indicates a terminal location controlled by the second network controller and the active set excludes a location controlled by the first network controller.

10. The method of claim 1, wherein the location information indicates at least one cell identifier, a routing area identifier or a location area identifier.

11. The method of claim 1, wherein the first and the second network controllers are associated with a first and a second switching element, respectively,
   each of the first and second switching elements being configured to maintain subscription information related to the terminal; and
   the first switching element being configured to receive location information and to send location information to the second switching element without a separate request.

12. The method of claim 11, wherein the location information comprises at least a Packet Data Protocol of the terminal, a Mobility Management context, a Packet Data Protocol of the terminal and a Mobility Management context.

13. The method of claim 11, wherein the first and the second switching elements are a support node, a switching center or a support node and a switching center.

14. The method of claim 13, wherein the support node is a substantially serving General Packet Radio Service support node and the switching center is a Mobile services Switching Center.

15. The method of claim 1, wherein the terminal is a mobile station, the access network is a radio access network and the network controller is a radio network controller.

16. A network controller for supporting a terminal in a telecommunications system including a core network and an access network, the network controller comprising:
   a reporting module configured to report location information of the terminal to the core network, and
   a transforming module configured to transform the location information into transformed location information,
   wherein the transforming module transforms the location information into transformed location information prior to the reporting module reporting the location information of the terminal to the core network,
   wherein the core network is configured to determine the terminal location and the access network includes a drift network controller configured to maintain a connection with the terminal, wherein the network controller is configured to act, at least temporarily, as a serving network controller of the terminal in the access network, and to report the terminal location to the core network, and wherein the network controller is configured to receive location information from the drift network controller and to report the transformed location information to the core network for determining the terminal location.

17. The network controller of claim 16, wherein the terminal has an active set including the terminal location when the location of the terminal exists and is controlled by the serving network controller.

18. The network controller of claim 17, wherein the location information indicates a virtual location when the active set of the terminal excludes a location controlled by the serving network controller.

19. The network controller of claim 17, wherein the location information indicates a current terminal location controlled by the serving network controller and the active set of the terminal includes the current terminal location.

20. The network controller of claim 17, wherein the location information indicates a terminal location which is at least partially controlled by the serving network controller.

21. The network controller of claim 16, wherein the location information indicates a terminal location controlled by the drift network controller and the active set excludes a location controlled by the serving network controller.

* * * * *